United States Patent [19]
Yoshihara et al.

[11] Patent Number: 4,797,756
[45] Date of Patent: Jan. 10, 1989

[54] METHOD FOR POSITIONING HEAD IN DISK DRIVE DERIVING "POSITION" OFFSET FROM "QUADRATURE" SIGNALS

[75] Inventors: Hideki Yoshihara, San Jose; Nicholas M. Warner, Livermore, both of Calif.

[73] Assignee: Unisys Corp., Detroit, Mich.

[21] Appl. No.: 22,189

[22] Filed: Mar. 5, 1987

[51] Int. Cl.$^4$ ............................................. G11B 20/00
[52] U.S. Cl. ................................................. 360/77.02
[58] Field of Search ..................................... 360/77, 78

[56] References Cited

U.S. PATENT DOCUMENTS 4,551,776 11/1985 Roalson ................................. 360/77
4,590,527 5/1986 Warner ................................. 360/78
4,628,380 12/1986 Quackenbush ........................ 360/77

Primary Examiner—Raymond F. Cardillo
Assistant Examiner—David L. Robertson
Attorney, Agent, or Firm—John J. McCormack; Kevin R. Peterson

[57] ABSTRACT

For a disk drive servo system using position and position-quadrature singals (P, Q), a method for automatically effecting "Absolute Track Registration" and compensating for "offsets" by using the peak position of one of signals (P or Q) to find "true" position (true offset) for the other (Q or P) wherein the R/W actuator is brought to rest at a reference position and sample-offset signal generated; while the corresponding magnitude of related positioning signals are detected—this being repeated until the peak values of said positioning signals is located whereupon the corresponding position-offset is derived as "true offset"—the actuator then being repositioned by this "true offset" value; and repeating this for a given number of track sites across the disk.

10 Claims, 3 Drawing Sheets

METHOD FOR POSITIONING HEAD IN DISK DRIVE DERIVING "POSITION" OFFSET FROM "QUADRATURE" SIGNALS

The purpose of this invention is to provide a method of automatically compensating for "offsets" in a servo control mechanism. Such offsets cause the "actual" rest positions of the servo mechanism to be offset from the "ideal" rest positions.

In existing disk drive products various methods are used to adjust the "rest positions" of the servo mechanism so that they are equally spaced (e.g. see U.S. Pat. No. 4,590,527 to WARNER). These methods, however, do not correct for misregistration of the rest positions so formed with the "ideal" rest positions. This invention addresses this problem.

DISADVANTAGES OF OLD METHODS

In many previous disk drive products a track registration adjustment was not required because the track pitches were lower. In newer disk drive products (e.g., #3682 DD by Unisys Corporation) track pitches are higher and the effects of track misregistration are more severe. Track misregistration can cause corruption of data on adjacent cylinders while writing, or corruption of data being read.

There are several possible causes of track misregistration. The components used in servo mechanisms are, by their nature, "non-ideal" so that all servo mechanisms suffer track misregistration to some degree. The electronic components used in servo control mechanisms are subject to aging and environmental effects. This will affect the track positioning and may cause track misregistration. The servo system contains many components which affect the track positioning; if any of these components is replaced the track registration may be affected.

The track registration adjustment method here taught is performed automatically by the machine at each "power-up." The effects of non-ideal components, component aging, environment and replacing of servo system components are, then, all automatically adjusted for.

BRIEF DESCRIPTION OF THE DRAWINGS

These and other features and advantages of the present invention will be appreciated by workers as they become better understood by reference to the following detailed description of the present preferred embodiments, which should be considered in conjunction with the accompanying drawings, wherein like reference symbols denote like elements.

DESCRIPTION OF THE PREFERRED EMBODIMENT

General Description, Background

Figure 2:
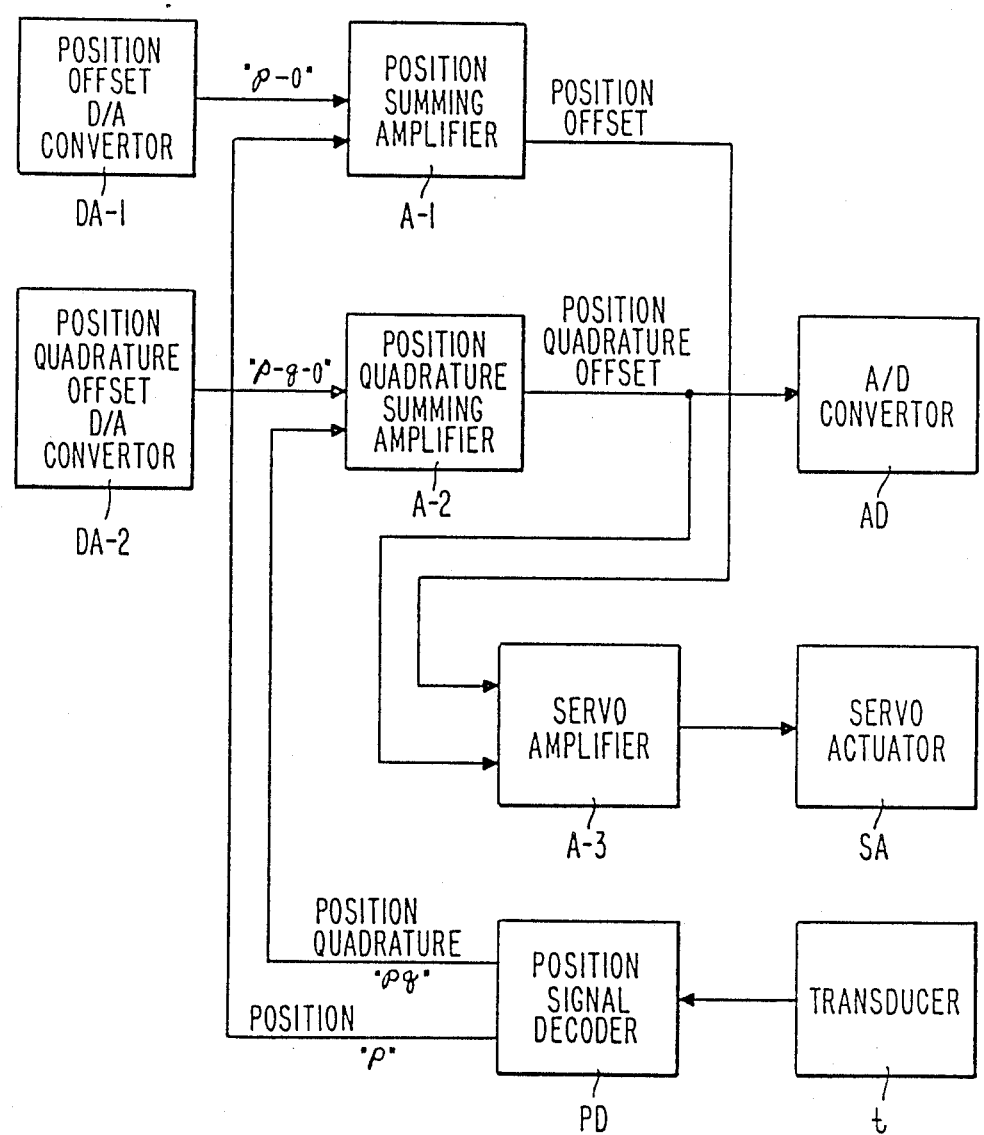
FIG. 2 is a schematic idealized block diagram of a preferred embodiment.

FIG. 2 schematically illustrates servo components adapted to implement the principles of this invention. This, and other means discussed herein, will generally be understood as constructed and operating as presently known in the art, except where otherwise specified. And, except as otherwise specified, all materials, methods and devices and apparatus herein will be understood as implemented by known expedients according to present good practice.

General Approach

Figure 1:
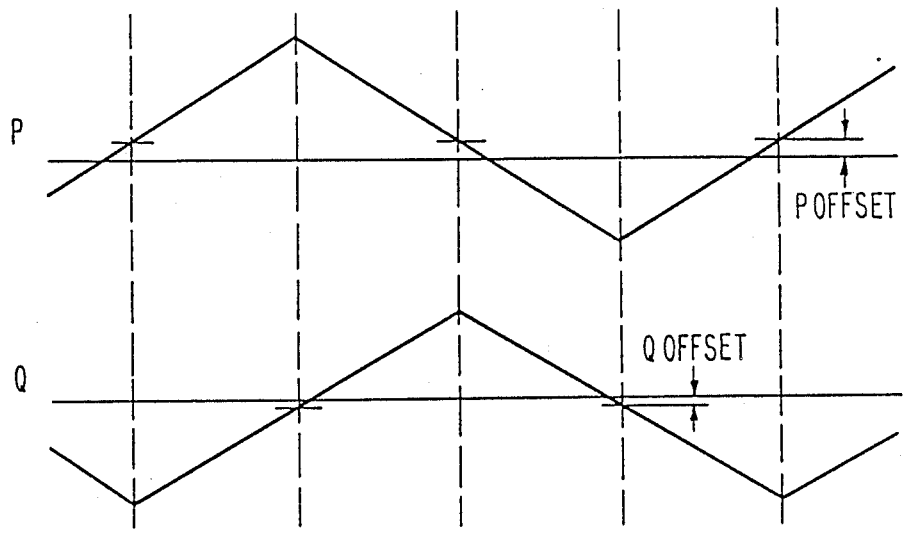
FIG. 1 is a plot of idealized offset "position" and "position quadrature" signals addressed by this embodiment, with FIG. 1A showing such signals together.

Track registration offsets may be introduced into the servo position signals by the demodulating process and by the servo amplifier circuitry. These offsets affect only the registration of the zero-crossings of the position signals, they do not affect the registration of the peaks of the position signals. Absolute track registration can therefore be obtained, for instance, by offsetting position signals so that zero-crossings occur at the peaks of the quadrature position signal. This is illustrated in FIG. 1.

Stated otherwise, one references on a putative, nominal "rest position" of a position P signal "P", (or Position Quadrature signal "Q") initial "offset" therefor, detects the corresponding amplitude of the other positioning signal (here, Q), iterates this until arriving at the "peak position" of this other signal and so derives "true offset," doing this for each of several zones (e.g. 4) across the disk.

Figure 1A:
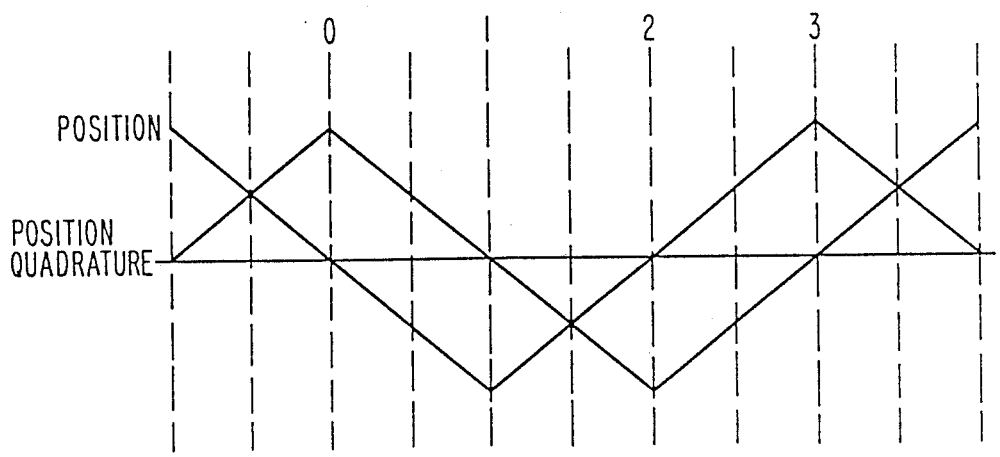

Referring to FIGS. 1A and 2, a preferred "Absolute Track Registration" technique will now be described, preceded by the following discussion of means therefore (FIG. 2).

A Position Signal Decoder PD will be understood (FIG. 2) to generate "Position" and "Position Quadrature" signals from servo information provided by a servo transducer (t). The "Position" and "Position Quadrature" signals are fed to respective Summing Amplifiers, A-1, A-2. A Position Offset Digital to Analog (D/A) Converter DA-1 is used to convert a binary input value to an analog voltage signal p-o which is fed to the Position Summing Amplifier A-1. A Position Quadrature Offset Digital to Analog (D/A) Converter DA-2 is used to convert a binary input value to an analog voltage signal p-q-o, which is fed to the Position Quadrature Summing Amplifier A-2. The Position Summing Amplifier A-1 adds the Position Offset p-o, to the Position signal "p." The Position Quadrature Summing Amplifier A-2 adds the Position Quadrature Offset p-q-o to the Position Quadrature signal pq. The output of the Position Quadrature Summing Amplifier A-2 is fed to an Analog to Digital (A/D) convertor AD which converts the analog voltage to a binary value.*
The outputs of both Summing Amplifiers are fed to a Servo Amplifier A-3. Servo Amplifier A-3 includes a power output stage which drives the Servo Actuator SA. Transducer t is coupled to Servo Actuator SA and provides positional information.

*Provision of such a converter and associated control means are new in the art.

The Position and Position Quadrature signals are shown in FIG. 2. where "rest positions" of the servo are numbered 0, 1, 2, 3, (many other such rest positions exist across the disk surface).

In an ideal servo system, the "Position" and "Position Quadrature" signals will be as shown in FIG. 1A and the rest positions of the servo system correspond to the zero-crossing points of the Position and Position Quadrature signals. In a practical system, however, the Position and Position Quadrature signals may be offset due to the component tolerances in the transducer and Position Signal Detector. This will affect the zero-crossing points of the Position and Position Quadrature signals and cause the actuator to be offset from the "ideal" rest positions. Component tolerances in the Servo Amplifier and the Servo Actuator may also cause the "actual" rest positions of the actuator to be offset from the "ideal" rest positions.

Adjustment

The Track Registration adjustment is performed as follows. The Servo Actuator is moved to rest position 0, the servo actuator is then offset from its rest position by applying a binary demand value through the Position Offset D/A Converter DA-1. The amplitude of the Position Quadrature signal is measured through the A/D Converter AD. The Position Offset is adjusted through the Position Offset D/A DA-1 until the rest position of the Servo Actuator is at the peak of the Position Quadrature signal.

Various methods can be used for finding the peak of the Position Quadrature signal, the preferred method here is to measure the amplitude of the Position Quadrature signal at points on either side of the peak and adjust these points until the amplitude of the Position Quadrature signal at the two points is equal. The peak of the Position Quadrature then lies midway between the two points. This method is insensitive to the shape of the peak which is usually poorly defined and gives a better resolution because the amplitude of the signal changes more rapidly away from the peak.

The offset applied through the Position Offset D/A to position the Servo Actuator to the peak of the Position Quadrature signal is the required track registration offset.

The disk surface is divided into a number of zones and the track registration adjustment is performed at one of the rest positions (0) in each of the zones. The track registration offset determined for each zone is applied at all of the rest positions of the servo mechanism within that zone to correct for track misregistration.

This method of track registration adjustment is effective because it uses the peaks of the Position Quadrature signals. The sources of track misregistration noted above affect the location of the zero-crossings of the Position and Position Quadrature signals, they do not affect the location of the peaks of those signals.

Such track registration is preferably performed in conjunction with a calibration to make track-spacings equal.

Other Adjustment Methods

The track registration adjustment described offsets the Servo Actuator using the Position signal and measures the Position Quadrature signal; other signals could have been used to achieve the same effect. For example, the Servo Actuator could have been offset from rest position (1) and the Position signal could have been measured. The adjustment method could be used in other ways; e.g., the track registration adjustment could be performed at each of the rest positions 0, 1, 2, and 3. The track registration offsets so obtained could be applied at the appropriate rest positions to correct for the causes of track misregistration noted above.

Figure 2A:
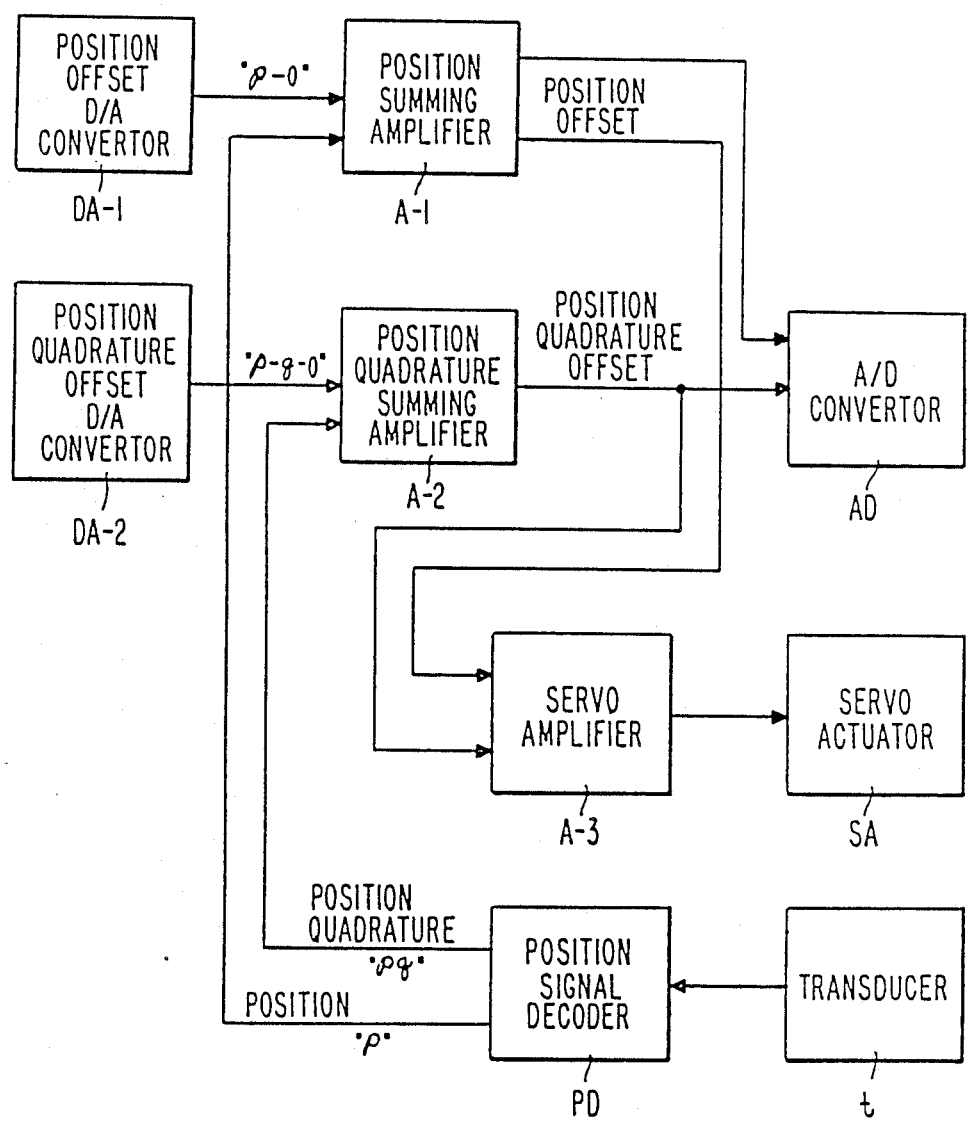
FIG. 2A is a diagram like FIG. 2 showing the embodiment there somewhat modified.

Alternative Adjustment Method (FIG. 2A)

The above method (FIG. 2, etc.) is replicated, except that the adjustment is performed at each track-crossing for all four signals ($\pm P$, $\pm Q$; note dual input to AD in FIG. 2A) rather just one.

That is, again, absolute track registration adjustment consists of positioning the servo on a track and performing a calibration to determine the offset of the peak of the quadrature position signal. This is the offset that must be applied to achieve absolute track registration. The servo is then positioned to the adjacent track and the same calibration is performed to determine the offset for the quadrature position signal. This is undertaken for all four positioning signals ($\pm P$, $\pm Q$).

The calibration for determining the offset of the quadrature position signal peak can be done using a balance algorithm. This algorithm finds the position of the peak by adjusting a trial peak position until the signal levels measured at equal positive and negative offsets from the trial peak are equal. This calibration method gives a better resolution than measuring the peak directly because the signal amplitude changes more rapidly away from the peak.

The absolute track registration adjustment would have to be done after the adjustment for the amplitudes of the position signals because the offsets required are dependent on the position signal amplitude. Since the above adjustment method can be used to position the servo at the peaks of the position signals, it can also be used to position the servo for measuring the peak amplitudes of the position signals for the amplitude adjustment.

This method is preferable to others conceivable because it is performed in track-following mode and therefore compensates for offsets introduced by the servo amplifier circuitry. Additionally, it does not require the peak detector circuitry needed by other methods.

Key features of this invention are that:
1. The Track Registration adjustment is performed automatically by the machine without manual intervention.
2. The Track Registration adjustment is performed by using the peak of the quadrature position signal.
3. Perform "Absolute Track Registration" adjustment without need for special alignment tracks.
4. Novel provision of A/D Converter (see AD, FIGS. 2, 2A) to receive "position" and offset signals and/or "position quadrature" plus offset to be applied (converted to binary signals) to control the actuator.

CONCLUSION

It will be understood that the preferred embodiments described herein are only exemplary, and that the invention is capable of many modifications and variations in construction, arrangement and use, without departing from the spirit of the invention.

Further modifications of the invention are also possible. For example, the means and methods disclosed herein are also applicable to other high density disk files, as well as to related systems. Also, the present invention is applicable for other related actuator registrations.

The above examples of possible variations of the present invention are merely illustrative. Accordingly, the present invention is to be considered as including all possible modifications and variations coming within the scope of the invention as defined by the appended claims.

What is claimed is:

1. A method of automatically effecting absolute track registration of a R/W actuator means in a disk file of a disk drive servo system including a servo transducer, and associated servo control means including means for generating positioning signals PS comprising position signals P and related position-quadrature signals Q, this method including the steps of:

registering the actuator means in a nominal initial rest position corresponding to a zero-crossing of one of the signals PS and causing an initial sample-offset thereof;

detecting the corresponding magnitude of another of the positioning signals PS, repeatedly, until arriving at the peak-value/location thereof, and using the position-offset corresponding to this peak-location to derive a tru-offset value T-O and repositioning actuator means by this value T-0; and repeating the foregoing for a prescribed number of track sites across the disk file.

2. The invention of claim 1 wherein said peak value is found by equalizing amplitudes on both sides thereof.

3. The invention of claim 2 wherein said nominal initial rest position is chosen to correspond to a zero-crossing of a position signal (P) and this is so adjusted and offset by the amount of misregistry thereof with the closest Q-peak position of the position-quadrature signals Q.

4. The invention of claim 3 where the Q-peak is found by locating points of equal magnitude on either side of Q-peak and taking the position midway therebetween.

5. The invention of claim 1 where this method of effecting track registration is combined with a calibration to equalize track-spacings.

6. The invention of claim 4 wherein the disk surface is divided into a number N of zones radially across the disk tracks and the said track-registration is performed at one rest position in each of these zones.

7. The invention of claim 2 wherein said nominal initial rest position is chosen to correspond to a zero-crossing of a position-quadrature signal Q and this is so adjusted and offset by the amount of misregistry thereof with the closest P-peak of the position signals P.

8. The invention of claim 7 where the P-peak is found by locating points of equal amplitude on either side of P-peak and taking the position midway therebetween as true-offset.

9. The invention of claim 2 wherein the adjustment is performed at each track-crossing for all positioning signals PS.

10. The invention of claim 6 wherein P offset and Q-offset signals are fed, suitably summed with P and Q and amplified, to an Analog-to-Digital Converter with P and Q, and to the servo amplifier controlling actuator movement.

* * * * *

UNITED STATES PATENT AND TRADEMARK OFFICE
CERTIFICATE OF CORRECTION

PATENT NO. : 4,797,756
DATED : January 10, 1989
INVENTOR(S) : Hideki Yoshihara, Nicholas M. Warner It is certified that error appears in the above-identified patent and that said Letters Patent is hereby corrected as shown below:

Col. 2, line 19 and 20, "a position P signal "P", (or Posi-tion Quadrature signal "Q") initial "offset" therefor," to --a position signal P (or Position Quadrature signal "Q"), then forces an initial "offset" therefor,--

Signed and Sealed this

Ninth Day of May, 1989

Attest:

DONALD J. QUIGG

Attesting Officer

Commissioner of Patents and Trademarks